United States Patent
Saito et al.

(10) Patent No.: US 6,643,681 B1
(45) Date of Patent: Nov. 4, 2003

(54) SYSTEM FOR CONSTRUCTING NETWORK COMMUNITY

(75) Inventors: Takayuki Saito, Tokyo (JP); Tatsuji Igarashi, Kawasaki (JP)

(73) Assignees: Data Cake Baker Corporation, Tokyo (JP); Kazuyoshi Maegawa, Mie (JP)

(*) Notice: Subject to any disclaimer, the term of this patent is extended or adjusted under 35 U.S.C. 154(b) by 0 days.

(21) Appl. No.: 09/459,816

(22) Filed: Dec. 13, 1999

(30) Foreign Application Priority Data

Nov. 17, 1999 (JP) .......................................... 11-326235

(51) Int. Cl.[7] .............................................. G06F 15/16
(52) U.S. Cl. ....................... 709/202; 709/204; 709/206; 707/6
(58) Field of Search ................................ 709/204, 205, 709/315, 202, 206; 707/227, 103, 104, 3, 4, 6; 370/260; 717/174

(56) References Cited

U.S. PATENT DOCUMENTS

| | | | | |
|---|---|---|---|---|
| 5,675,788 A | * | 10/1997 | Husick et al. | 707/1 |
| 5,963,944 A | * | 10/1999 | Adams | 709/202 |
| 6,094,675 A | * | 7/2000 | Sunaga et al. | 707/10 |
| 6,101,532 A | * | 8/2000 | Horibe et al. | 709/204 |
| 6,163,782 A | * | 12/2000 | Singhal | 707/104 |
| 6,185,602 B1 | * | 2/2001 | Bayrakeri | 709/204 |
| 6,347,317 B1 | * | 2/2002 | Singhal | 707/3 |
| 6,424,994 B1 | * | 7/2002 | Pirich et al. | 370/261 |

FOREIGN PATENT DOCUMENTS

JP    11-306022    11/1999

OTHER PUBLICATIONS

Hattori, F., "Trend of Agent Communication Technology," Joho–shori, Shadan–hojin Joho–short Gakkai, Nov. 15, 1998, vol. 39, No. 11, pp. 1118–1123 (CS–NG–2000–00773–009).

Iida, I., et al., "New Intelligent Media Technology Supporting Network Society, Mobile Agent & Network," Joho–shori, Shadan–hojin Joho–shori Gakkai, Jan. 15, 1997, vol. 38, No. 1, pp. 17–23 (CS–NG–1997–00252–003).

* cited by examiner

Primary Examiner—Marc D. Thompson
(74) Attorney, Agent, or Firm—Christensen O'Connor Johnson Kindness PLLC (57) ABSTRACT

A network community system capable of spontaneously, autonomously forming and managing a network community space allowing interactive communication, exchange of opinions and exchange of information among users of a plurality of computers connected to a computer network such as the Internet is disclosed. This system is an application software (CSW) installed in each of the users which become community members and functions as a platform for forming the network community space. This system constructs a logical path network for exchanging agents among the computers according to the startup of the CSW. Each of the agents transports a message written by a computer user who transmits the message to the computers of other users and registers the message in a message database.

13 Claims, 4 Drawing Sheets

| USER ADDRESS | MESSAGE |
|---|---|
| USER (A) | Ma |
| USER (A) | Mb |
| USER (D) | Md |
| USER (E) | Me |

SYSTEM FOR CONSTRUCTING NETWORK COMMUNITY

BACKGROUND OF THE INVENTION

The present invention relates to a network community system for constructing a network community capable of particularly having interactive communication on a subject with a high similarity, exchanging information or carrying on electronic commerce among a plurality of network users on a computer network represented by the Internet by utilizing, for example, a distributed object technology.

In recent years, on a computer network represented by the Internet, a network community capable of having interactive communication and exchanging information by exchanging messages among a plurality of network users (which will be sometimes simply referred to as "users" hereinafter) on a specific subject has been realized. The messages herein mean information including not only text data such as a text in an electronic mail message but also voice data and image data.

Specifically, an electronic conference, a forum and a mailing list service are well-known network communities. In any system, a system manager or organizer presets a plurality of subjects, allows users to participate on the respective common subjects and to thereby realize conferences or exchange of opinions and exchange of information among the participating users.

The network community allowing a conference, exchange of opinion or exchange of information among participating users centering around common subjects is a kind of a network service realized particularly through the Internet.

Meanwhile, a conventional network community makes use of a client/server system and is provided by a business company such as an Internet service provider which operates the server. The conventional system is, therefore, a community provided on the network in a closed cyberspace. In other words, the system is a community operated on preset specific subjects and members of the system are only users who positively demonstrate the intent of participation and then participate in the community. Therefore, the conventional network community is lacking in expansibility or flexibility since participants are fixed or users who are interested in a plurality of subjects need to comply with formalities to participate in the community.

In view of the future development of computer networks such as the Internet, it is desirable that a network community is generated spontaneously, autonomously without the need of a server managed by a specific service provider business company.

BRIEF SUMMARY OF THE INVENTION

It is an object of the present invention to provide a network community system capable of spontaneously, autonomously generating and managing a network community allowing interactive communication, exchange of opinions and exchange of information on a common subject or a subject with a high similarity on a computer network such as the Internet without the need of a server managed by a specific business company.

The present invention is related to a system for constructing a network community capable of dynamically generating a group of community users (users) loosely linked to one another by a theme with a high similarity and realizing a so-called electronic conference, interactive communication (electronic chat), information exchange or electronic commerce.

A system according to the present invention has means for establishing a logical path network for exchanging information including programs and data among computers on a computer network, means for exchanging agents including a message through the logical path network, message storing means for registering messages included in agents transmitted from other computers and accumulating a group of messages for the respective computers, and means for referring to the messages accumulated by the message storing means of the respective computers.

The network community system according to the present invention is a kind of an application software installed in a computer of each user and functions as a platform for generating a network community. This system is provided with, as main constituent functions, a logical path network establishing function, a communication function (including agent exchanging means) and a data storing function (message storing function).

In other words, this system generates a logical path network among the computers connected to the network and exchanges agents through this path network. The logical path network is not fixedly generated but may be changed based on predetermined conditions. The agent is, for example, an object (object-oriented program) consisting of data and a method of processing the data, and executes predetermined processing while moving on the network.

Namely, according to the present invention, the agent carries a message created by a certain computer network user to other computers and executes processing for registering the message in the message storing means of the other computers. At this time, information (e.g., a mail address) for specifying the user who wrote the message on the network is added to the message. The agent also executes processing for referring to messages accumulated in the message storing means and retrieving a message on a subject with a high similarity to the message carried by the agent itself. Further, the agent has a function of posting information for specifying a user who wrote the retrieved message to the computer user who transmits the message carried by the agent.

In the system constituted as stated above, a plurality of users who are interested in a certain subject transmit their own messages on, for example, the Internet, whereby a community to which the users belong, is spontaneously, autonomously generated. In other words, it is possible to form a network community consisting of members loosely linked to one another by a subject with a high similarity, on the Internet without the need of a specific server function. The network community is characterized in that it is generated not by users' participation in the community on a preset subjects but generated loosely and autonomously by individual network users' transmission of free messages. The network community does not require special formalities to comply with for participation. In addition, if a single user is interested in a plurality of subjects, the user can belong to communities for the respective subjects by transmitting messages on the respective subjects.

The users belonging to a common community can hold an electronic conference, have interactive communication, exchange opinions and exchange information on a one-to-one basis or among plural users by utilizing an electronic mail function or the like. Furthermore, if the content of the common subject is related to a specific business, it is possible to execute so-called electronic commerce to the respective users.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, one embodiment according to the present invention will be described with reference to the accompanying drawings.

FIGS. 1 to 4 are conceptual views related to the construction of a network community system in this embodiment.
[System Construction]

Figure 1:
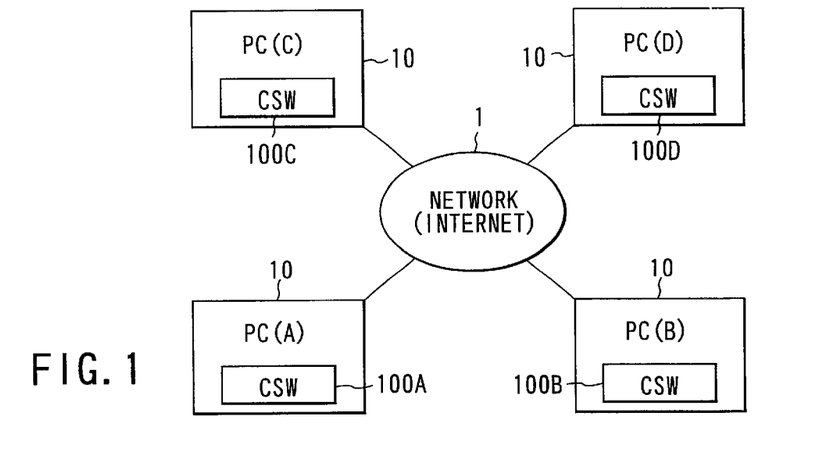
FIG. 1 is a block diagram showing the construction of a computer network in one embodiment according to the present invention.

As shown in FIG. 1, it is assumed in this embodiment that a plurality of computers (PC) 10 are connected to a computer network (particularly the Internet) 1. Each PC 10 starts pre-installed application software in the hard disk drive (or community software to be referred to as "CSW"hereinafter) 100A to 100D, thereby forming a network community in this embodiment. That is, the CSW 100A to 100D are main constituent elements of a network community system in this embodiment.

Users (A to D) of the PC 10 (A to D) operate the CSW 100A to 100D through GUIs (Graphical User Interface) 20 provided on the PCs 10, respectively, and establish a network community space spontaneously and autonomously.

Each of the CSW 100A to 100D has roughly three functions, i.e., a logical path network establishing function, an agent transmitting function (transmission and reception function), a communication function and a message storing function. The logical path network establishing function is to establish a path 200 serving as a logical path and mutually connect with the CSW installed in other PCs. The agent transmitting function, the communication function and the message storing function will be described later.

The logical path network establishing function (to be referred to as "path establishing function" hereinafter) changes the path 200 according to system stability. The system stability means the working duration ratio of a CSW installed in each PC 10 and expressed as a function of the stop frequency or accumulated stop duration of the CSW. Namely, if each PC 10 is connected to the network 1 and CSW working duration is longer than CSW stop duration (i.e., a working ratio is higher), it is determined that the stability of the system is high. Conversely, if duration for which each PC 10 is disconnected from the network 1 because, for example, the PC 10 is turned off, is longer, the stop frequency or accumulated stop duration is longer and it is determined that the stability of the system is low. It is noted that the CSW includes a function of storing an operating state at the moment the CSW stops in a disk drive and allowing the CSW to return to the operating state before stop when the CSW is started next time.

Figure 2:
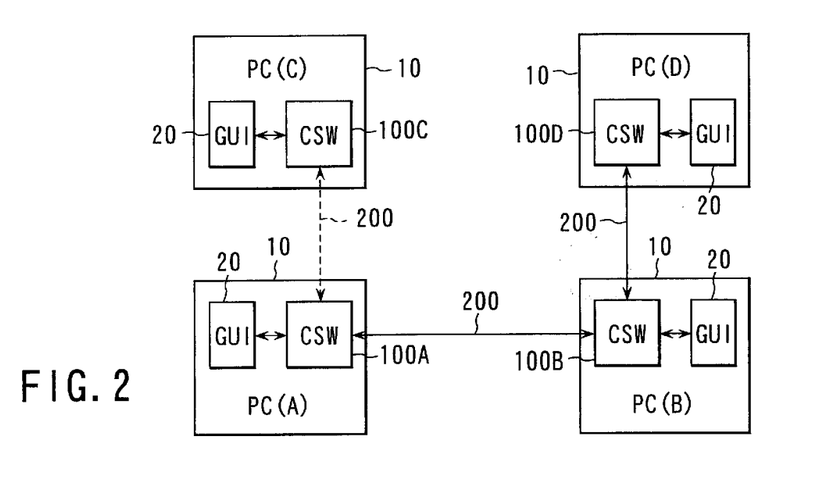
FIG. 2 is a block diagram for describing the construction of a network community system related in this embodiment.

To be specific, as shown in FIG. 2, when the CSW 100A of the PC 10(A) is started, the CSW 100A establishes a path 200 for connecting to the CSW 100B of the PC 10(B) at, for example, an initial time. If the working duration ratio of the CSW 100B of the PC (B) decreases and it is determined that system stability is low, then the path establishing function of the CSW 100A disconnects the path 200 connecting to the CSW 10B of the PC 10(B) and generates a path 200 connecting to, for example, the CSW 100C on the PC 10(C). The path establishing function also establishes a path 200 for connecting to the respective CSW of a plurality of PC 10 (e.g., 10B and 10C). In, short, the path 200 is not fixed. Instead, the respective CSW mutually exchange their stability information and a path 200 is established between the CSWs positioned at a relatively short distance reachable by following the path and having high stability, whereby a stable logical path network is autonomously established as a whole.

[Establishment of the Network Community]

Referring now to FIGS. 3 to 8 as well as FIGS. 1 and 2, the operation of the community system in this embodiment will be described.

Figure 8:
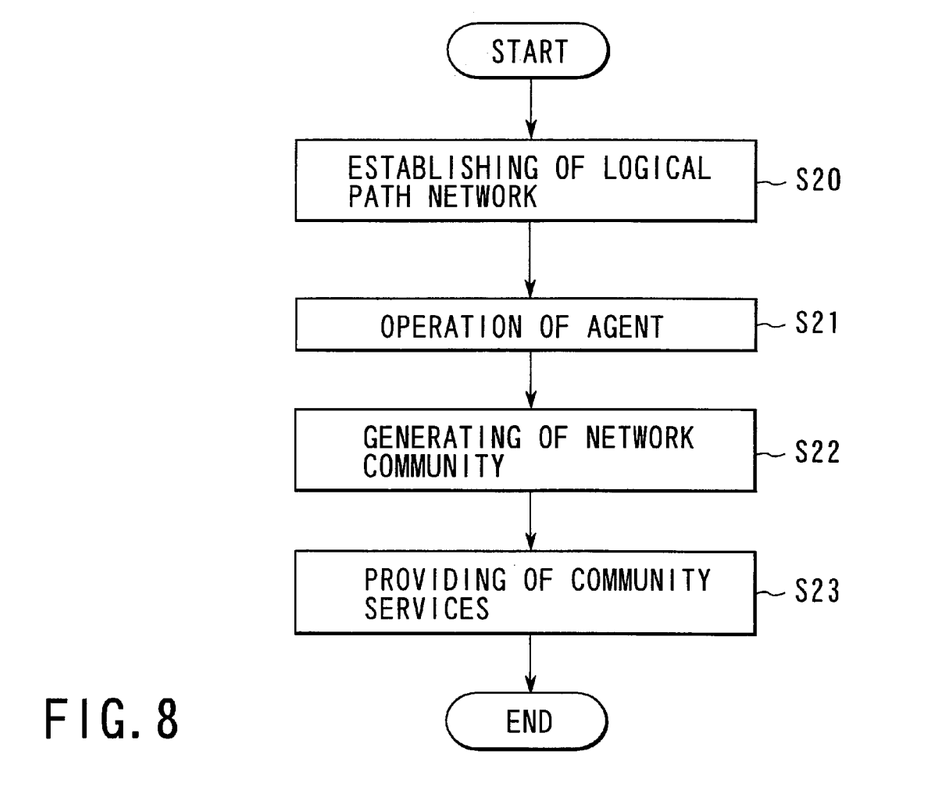
FIG. 8 is a flow chart for describing a method of establishing the network community in this embodiment.

The community system in this embodiment establishes a network community space through a method roughly including steps S20 to S23 shown in the flow chart of FIG. 8. First, the establishment of a logical path network in step S20 will be described with reference to the flow chart of FIG. 5.

The establishment of a logical path network means the generation of a platform to form a network community. As shown in FIG. 1, the CSW 100A to 100D stated above are installed in the respective PCs 10 (A to D) connected to the Internet 1 (in step S1). The users (A to D) start the CSW 100A to 100D through the GUIs 20, respectively, as shown in FIG. 2 (in step S2).

Each of the CSW 100A to 100D executes the generation of a path to connect with other CSW by means of the logical path network establishing function described above (in step S3). At this moment, each logical path network establishing function exchanges information of CSW stability and executes path change processing repeatedly at need so as to establish a path with the CSW having relatively high stability and positioned at a relatively short distance reachable by following the path 200 (in steps S4, S5 and S6). Through these steps, a platform serving as an environment for forming a network community is constructed as shown in FIG. 2.
[Activities of Agent]

Figure 6:
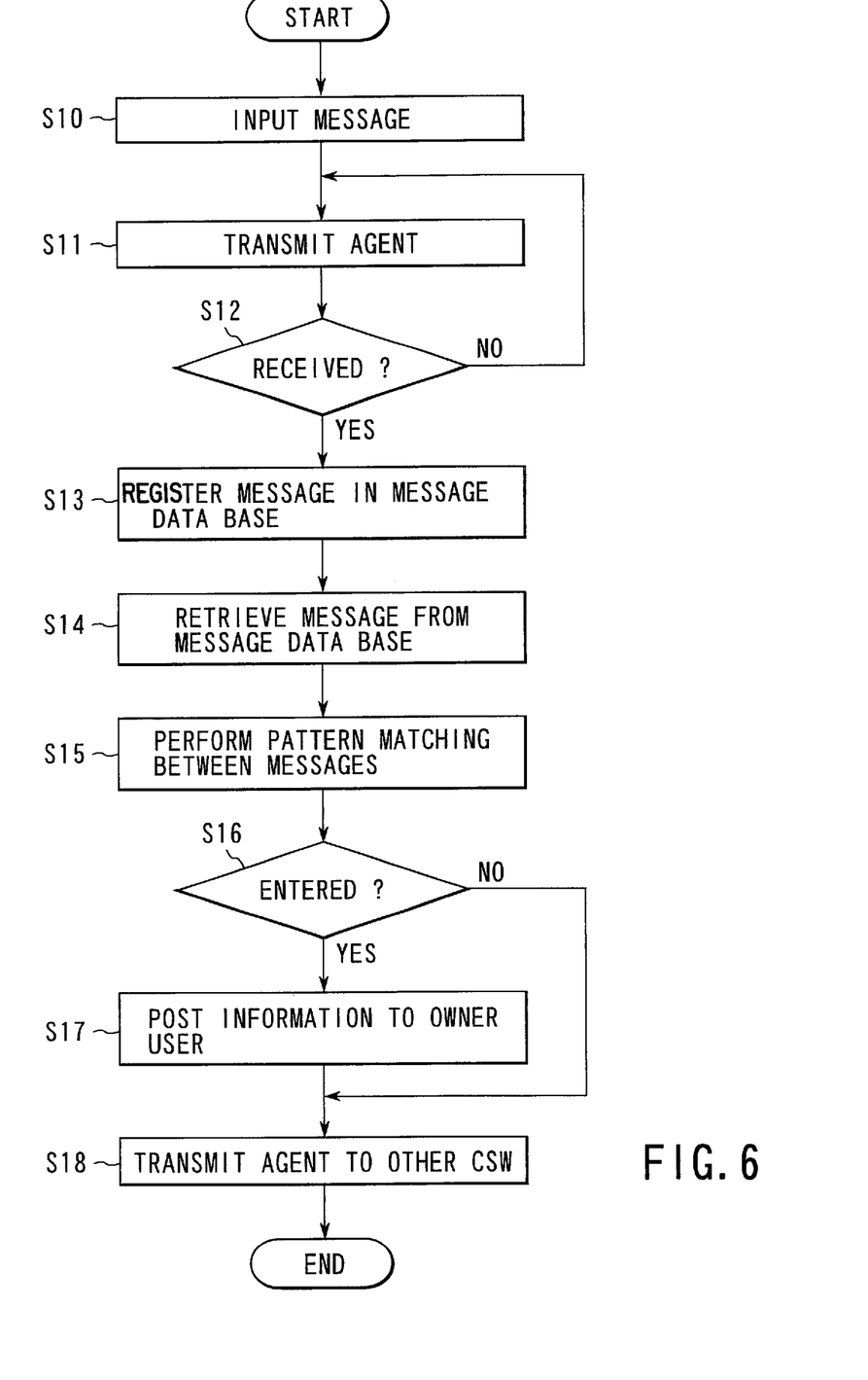
FIG. 6 is a flow chart for describing the activities of the agent in this embodiment.

Next, the activities of an agent (step S21) will be described with reference to FIGS. 3 and 6.

Each of the CSWs 100A to 100D has the agent transmitting function, the communication function and the message storing function. The agent may be a kind of an intelligent agent consisting of an object (object-oriented program)

comprised of data and a method for processing the data. The agent is moved on the network and executes the following specific processings.

It is now assumed that the user (A) of the PC 10(A) creates a message on a specific subject, embeds the message in an agent and transmits the agent to the path network. The CSW 100A of the user A inputs a message inputted through the GUI 20 into the agent (Aa) (in step S10). The CSW 100A further transmits the agent (Aa) to other CSW through the path 200 (in step S11).

Figure 3:
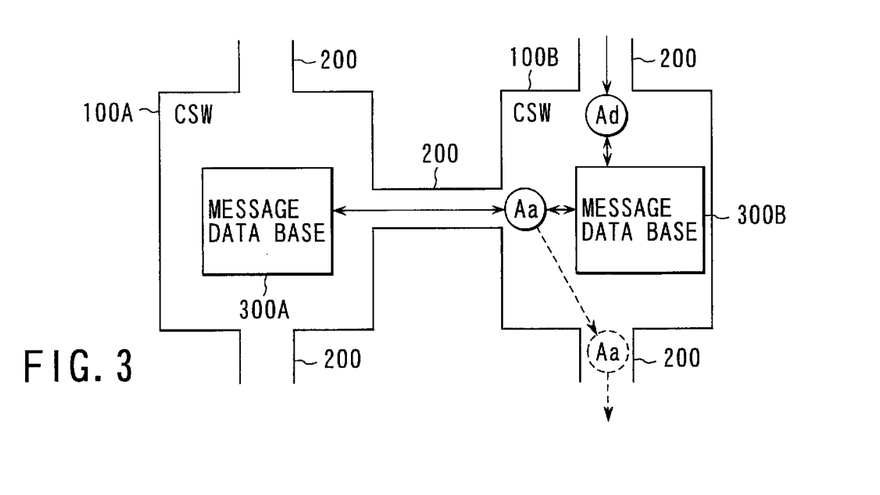
FIG. 3 is an explanatory view for the activities of an agent in this embodiment.

As shown in FIG. 3, it is then assumed that the agent (Aa) transmitted from the CSW 100A is moved by way of the path 200 and received by the CSW 100B of the user B ('YES' in step S12). It is noted that each of the CSW 100A to 100D has a function (message storing function) of establishing a message database (to be referred to as "message DB" hereinafter) for accumulating messages.

The agent (Aa) operates the message DB 300B of the CSW 100B and registers (copies) the message written by the user A (in step S13). Information (e.g., an e-mail address and a network address) which can specify the user A and the user A's CSW on the network are added to the message.

Figure 4:
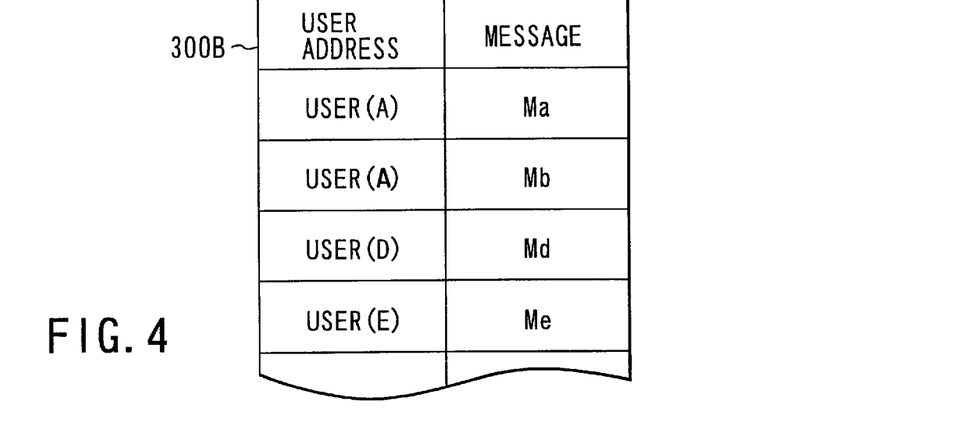
FIG. 4 is an explanatory view for a message database in this embodiment.
Figure 5:
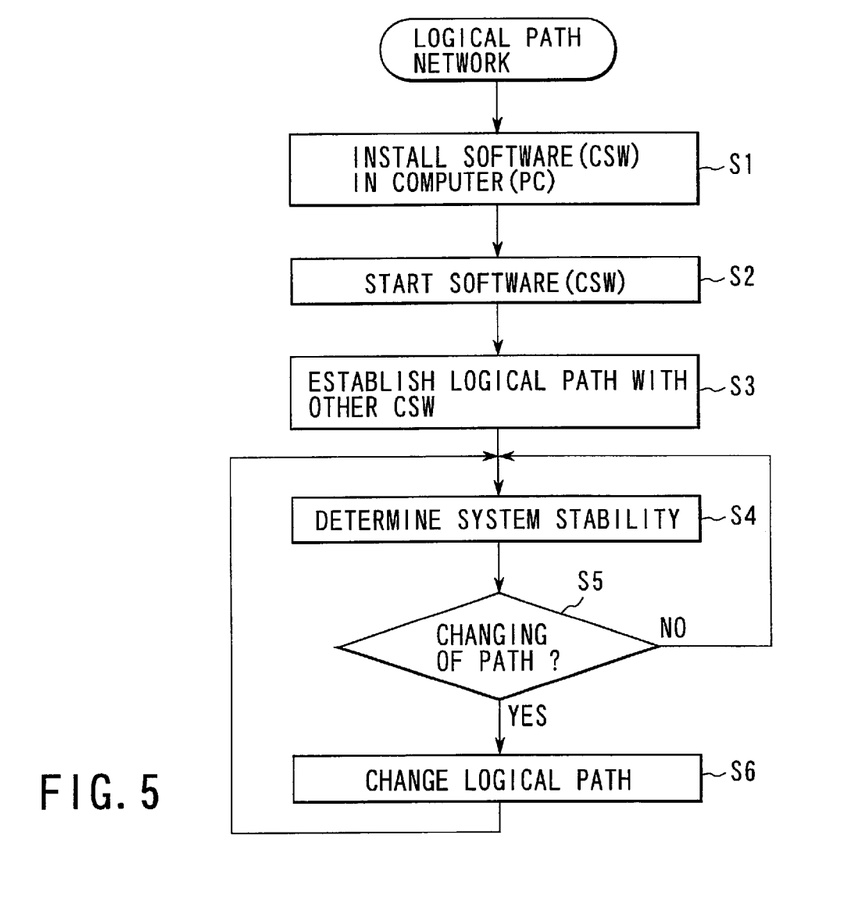
FIG. 5 is a flow chart for describing a method of establishing a logical path network in this embodiment.

The message DB 300B accumulates messages as well as information for specifying users or respective users' CSW as shown in FIG. 4. That is, the message (Ma) copied by the agent (Aa) together with the information which can specify the user (A) who transmits the message (Ma) is registered in the message DB 300B. There are cases where a message (Mb) on a different subject transmitted from the same user (A) as that of the message (Ma) is registered in the message DB 300B. Also, there are cases where a message (Md) is registered in the message DB 300B by an agent (Ad) transmitted from the CSW 100D of the user (D) with information specifying user (D) who transmits the message (Md) (e-mail address of D) added to the message (Md).

As stated above, the user (A) registers the messages on specific subjects in which the user (A) is interested, in the message DB 300B of the other user (B) on the network. At this time, the user (A) can register the messages not only in the message DB 300B of the user (B) but also in the message DBS of a plurality of users indirectly reachable through the path 200. The user (B) can read out accumulated messages for the respective users by operating CSW 100B of the user (B) at need and referring to the message DB 300B. By doing so, the user (B) can know of the subjects in which the user (A), for example, is interested from the messages written and registered by the user (A). It is, therefore, possible that the user (B) utilizes, for example, an ordinary electronic mail function for the Internet, transmits a message to the mail address of the user (A) and has interactive on-line communication (electronic chat), exchanges opinions or exchanges information with the user (A).

The user (B) can simultaneously transmit the same message to not only the user (A) but also users (D) and (E) who are interested in a common subject (including a subject with a high similarity) by utilizing electronic mail multicasting function. This makes it thereby possible to conduct an electronic conference among the users (A), (B), (D) and (E) on the common subject.

In this way, a communication autonomously starts among the users who are not associated with one another in an initial state. Namely, a network community is formed.

Next, the communication function of the agent will be described.

After adding address information on the user (A) to the carried message (Ma) and registering the address information-added message (Ma) in the message DB 300B of the CSW 100B, the agent (Aa) refers to the message DB 300B (in step S14). The agent (Aa) compares the message from the user (A) who transmits the message (owner user, i.e., CSW 100A) with other messages and retrieves the messages which fall within a high similarity range (including a common subject) (in step S15). Namely, the agent (Aa) executes pattern matching between messages and retrieves other messages with a predetermined similarity (e.g., the number of common keywords). It is noted that the pattern matching includes automatically extracting words from messages and examining similarities among the extracted words.

If the agent (Aa) cannot discover messages with a high subject similarity from the message DB 300B, the agent (Aa) is transmitted to other CSW through the path 200 by utilizing the transmitting function of the CSW 100B of the user B ('NO' in step S16, and step S18).

Meanwhile, if the agent (Aa) discovers that messages from other users which fall within a range of high subject similarity are registered in the message DB 300B, it posts the information to the CSW 100A of the owner user A ('YES' in step S16, and step 17). In this case, the posted information is that for specifying the message (e.g. Md) determined to have a high similarity and the user who registered the message. The owner's CSW 100A stores the information (mail address) for specifying the user and the message (e.g., Md) posted by the agent (Aa) in, for example, the message DB 300A.

By the above-stated communication function of the agent, the owner user (A) of the agent can automatically know of the user (e.g., user D) who wrote a message with a high subject similarity from among the messages accumulated in the message DB (300B) of the other user (user B). In other words, each user can transmit a message on a specific subject, in which the user himself is interested, to the remaining users and know of a user who is interested in the specific subject among the users.

Accordingly, the owner user (user A) of the agent can transmit a message to the mail addresses of other users who are interested in a common subject and have interactive communication, exchange opinions and exchange information with the other users by utilizing, for example, the ordinary electronic mail function for the Internet. The user (A) can also simultaneously transmit the same message to a plurality of users by utilizing, for example, the electronic mail multicasting function. This makes it possible for the user (A) and the other users to conduct an electronic conference as network community members (community members).

[Generation of Cluster and Application]

Figure 7:
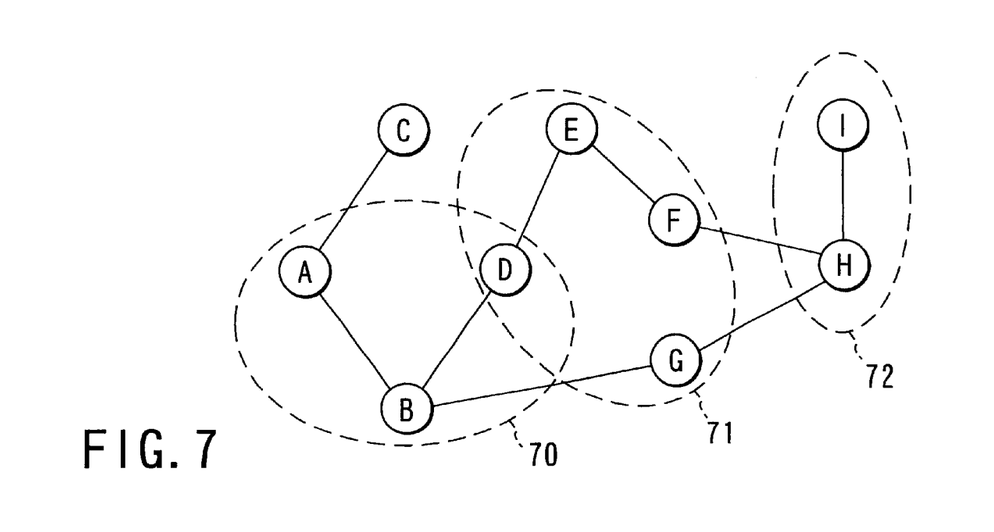
FIG. 7 is an explanatory view for the concept of a network community in this embodiment.

Through the establishment of the logical path network (or generation of a platform) and the activities of the agent as stated above, clusters (network communities) 70 to 72 for respective common subjects are generated from among a lot of users on the Internet 1 as shown in FIG. 7 (in step S22). Namely, the cluster 70 is a community consisting of community members (PC users A, B and D) who are interested in a certain common subject. The cluster 71 is a community consisting of community members D, E, F and G who are interested in another common subject. In this case, the community member (D) belongs to both the cluster 70 and the cluster 71. The cluster 72 is a community consisting of community members I and H who are interested in yet another common subject. Although the PC user (C) is connected to the CSW of the community member (A) through the path, the user (C) has no interesting common subject shared among the other users at this moment.

By forming the clusters 70 to 72 stated above, a network community space consisting of a plurality of community members linked to one another by common subjects is established. This network community space is spontaneously, autonomously formed not through the server function of a specific service provider but by users' transmission of messages. In other words, the respective users on the network can spontaneously, autonomously establish the above-stated network community space by establishing the logical path network (path network), exchanging agents and accumulating messages by utilizing respective CSW functions installed in their own computers.

The community space is not fixed but formed dynamically by the exchange of arbitrary messages from the respective community members through their respective agents. To be specific, if a user is to participate in a certain cluster or leave a cluster, the user does not need to particularly comply with determined formalities. If the user is to take participation, he or she may write a message on a subject in which the user is interested and transmit the message through the user's agent. Furthermore, a new cluster is generated if messages on a new them are transmitted from the present user group or a new user group.

If this network community space is formed, users can conduct an electronic conference, have interactive communication, exchange opinions and exchange information in the community space by utilizing, for example, the ordinary electronic mail functions through the Internet. In addition, the common subject is related to a specific business, it is possible to execute various types of applications including an application of so-called electronic commerce to the respective users. In other words, it is possible to realize providing services specific to network communities (in step S23).

A distributed object technology can be utilized for the construction of a logical path network among the respective CSWs or the generation of agents in this embodiment. It is also possible to utilize a network technology or a software technology other than the distributed object technology for these purposes. The present invention should not be, therefore, limited to any specific means to realize the object of the present invention.

As stated so far in detail, according to the present invention, a network community consisting of a plurality of community members loosely linked to one another by the similarity of topics on a computer network such as the Internet can be dynamically formed and a network community space which can realize an electronic conference, interactive communication (electronic chat), information exchange or electronic commerce, can be thereby established. In other words, the present invention can provide a network community system capable of spontaneously, autonomously generating and managing a network community space, in which interactive communication (chat), exchange of opinions and exchange of information on a subject with a high similarity or on a common subject can be realized, on a computer network such as the Internet, without the need of a server operated by a specific service provider.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for constructing a network community for communicating between a plurality of computers, wherein each of the computers comprises:

transmitting means for generating an agent a function and including a message relating to a user, and transmitting the agent to the network, wherein the agent comprises a software module moving on the computer network and executing predetermined processing; and message storing means for receiving the agent and storing the message included in the agent in association with information specifying the user associated with transmitting the message;

wherein the agent identifies a message having a predetermined similarity to the message relating to the user from a plurality of messages stored in the message storing means that received the agent, and posts the identified message via the network to the user associated with the message.

2. A system according to claim 1, wherein each of the computers further comprises connecting means for exchanging information relating to a stability status of the computer with the connecting means of other computers and constructing a communication path with the connecting means of other computers based on the information.

3. A system according to claim 2, wherein the agent has a function of referring to the plurality of messages accumulated in the message storing means provided in the computer on the communication path, and a function of executing pattern matching between the accumulated messages and the message generated by the computer user associated with the message.

4. A system according to claim 2, wherein the connecting means has a function of exchanging information on stability among the computers connected to the computer network and dynamically changing a logical path network so that computers having higher stability can be mutually connected with high probability.

5. A system according to claim 3, wherein the agent has a function of, upon identifying a message with a predetermined similarity to the message generated by the computer user associated with the message in the message storing means provided in the computer on the communication path based on a result of executing the pattern matching, posting information specifying a computer user associated with the identified message in the message storing means to the computer user associated with the agent.

6. A system according to claim 3, wherein the agent automatically extracts words from the messages accumulated in the message storing means and from the message generated by the computer user associated with the message, and executes pattern matching for comparing similarities of the respective words.

7. A system according to claim 3, wherein the agent executes pattern matching for examining similarities of the messages accumulated in the message storing means to the message generated by the computer user associated with the message based on a keyword added to the message by the computer user.

8. A system according to claim 1, wherein each of the computers further comprises means for exchanging information between users on the basis of the posting of the identified message.

9. A system according to claim 1, wherein the agent has a function of registering the message created by the computer user associated with the message in the message storing means provided in the computer on a transmitting path, and a function of posting a result of executing predetermined processing to the computer user associated with the message.

10. A system for forming a network community, comprising:
- a plurality of computers connected to a computer network;
- path establishing means for establishing a logical path network for exchanging information including programs and data among the plurality of computers;
- means for transmitting an agent to the computer network, the agent including a message generated by a user of a computer among the plurality of computers and having a pattern matching function of identifying a message on a subject with a high similarity to the subject of the message generated by the user;
- message storing means for registering the message included in the agent received through the logical path network together with information specifying the user who generated the message, and for accumulating a group of messages for each of the plurality of computers; and
- means for exchanging information between the user who generated the message included in the agent and a user who generated a message on a subject with a high similarity to the subject of the message generated by the user as identified in the message storing means by the pattern matching function of the agent.

11. A system according to claim 10, wherein the path establishing means and the agent are constructed by utilizing a distributed object technology.

12. A method of forming a network community, the network community allowing exchange of information among users of a plurality of computers connected to a computer network, the method comprising the steps of:
- installing a network community system, wherein each of the plurality of computers comprises a software module having a function of generating an agent including a message and a function of transmitting the agent to the network;
- transmitting an agent including a generated message among the computers through the network; and
- storing the message carried by the agent received through the network together with information specifying a computer user who generated the message;
- wherein the agent identifies a message having a predetermined similarity to the message carried by the agent and posts the identified message via the network to the user associated with transmitting the agent.

13. A method according to claim 12, further comprising the step of:
- after identifying a message having a predetermined similarity to the message carried by the agent, posting information specifying a computer user who generated the identified message to the user associated with the agent.

* * * * *

UNITED STATES PATENT AND TRADEMARK OFFICE
CERTIFICATE OF CORRECTION

PATENT NO. : 6,643,681 B1
DATED : November 4, 2003
INVENTOR(S) : T. Saito et al.

It is certified that error appears in the above-identified patent and that said Letters Patent is hereby corrected as shown below:

<u>Title page,</u>
Item [56], References Cited, OTHER PUBLICATIONS, "Joho-short" should read
-- Joho-shori --

<u>Column 8,</u>
Line 5, "agent a function" should read -- agent including a function --
Line 6, "including a message" should read -- a message --
Line 19, "with the message." should read -- with transmitting the message. --

Signed and Sealed this

Third Day of February, 2004

JON W. DUDAS
*Acting Director of the United States Patent and Trademark Office*